US009327781B2

(12) United States Patent
Hopkins

(10) Patent No.: US 9,327,781 B2
(45) Date of Patent: May 3, 2016

(54) TRAILER STABILIZING JACK

(71) Applicant: Safety Jacks, LLC, Antwerp, OH (US)

(72) Inventor: Kirk L Hopkins, Antwerp, OH (US)

(*) Notice: Subject to any disclaimer, the term of this patent is extended or adjusted under 35 U.S.C. 154(b) by 0 days.

(21) Appl. No.: 14/183,890

(22) Filed: Feb. 19, 2014

(65) Prior Publication Data
US 2014/0252194 A1  Sep. 11, 2014

Related U.S. Application Data

(60) Provisional application No. 61/773,862, filed on Mar. 7, 2013.

(51) Int. Cl.
F16M 13/00 (2006.01)
B62D 53/08 (2006.01)
B66F 5/02 (2006.01)

(52) U.S. Cl.
CPC ............ *B62D 53/0857* (2013.01); *B66F 5/025* (2013.01)

(58) Field of Classification Search
CPC ........ E04G 25/06; E04G 21/26; A47G 33/12; A47G 1/16; A47G 1/24; E04F 21/1805; E04F 21/1833; F16L 3/2053; F16L 15/067; F16M 7/00; B62D 53/0857; B60S 9/02
See application file for complete search history.

(56) References Cited

U.S. PATENT DOCUMENTS

| 1,701,122 | A | | 2/1929 | Ridgeway |
| 2,129,806 | A | | 9/1938 | Woodworth |
| 2,891,764 | A | * | 6/1959 | Pearne ............... 254/1 |
| 3,028,145 | A | | 4/1962 | Brand |
| 3,327,996 | A | * | 6/1967 | Morse ............ 254/2 R |
| 3,370,725 | A | * | 2/1968 | Jones ............ 414/458 |
| 3,647,183 | A | * | 3/1972 | Rishovd ............ 254/2 B |
| 3,937,443 | A | * | 2/1976 | Durgan ............ 254/10 B |
| 4,099,695 | A | | 7/1978 | Shinn, Jr. |
| 4,169,581 | A | | 10/1979 | Thurmond, Jr. |
| 4,942,941 | A | * | 7/1990 | Anderson ............ 182/136 |
| 5,397,207 | A | * | 3/1995 | Arellano et al. ............ 414/11 |
| 5,553,825 | A | * | 9/1996 | Rasmussen ............ 248/354.3 |
| 5,662,315 | A | * | 9/1997 | Neiss et al. ............ 269/17 |
| 5,711,512 | A | * | 1/1998 | Kauffman ............ 254/2 B |
| 5,785,330 | A | * | 7/1998 | Shoquist ............ 280/81.6 |
| 5,975,241 | A | * | 11/1999 | Berish et al. ............ 182/136 |
| 5,992,824 | A | * | 11/1999 | Voss ............ 254/2 B |
| 6,089,544 | A | | 7/2000 | Ellis |
| 6,213,491 | B1 | * | 4/2001 | Southard, Jr. ............ 280/475 |
| 6,505,815 | B1 | * | 1/2003 | Dellamore ............ 254/2 B |
| 6,607,183 | B1 | * | 8/2003 | White et al. ............ 254/420 |
| 7,581,713 | B1 | * | 9/2009 | Voss ............ 254/2 R |
| 8,016,257 | B2 | | 9/2011 | Di Biase |
| 2004/0021280 | A1 | * | 2/2004 | Peggs ............ 280/47.24 |
| 2014/0166950 | A1 | * | 6/2014 | Wiegel et al. ............ 254/2 R |

OTHER PUBLICATIONS

SAF-Holland Group Catalog, JS2000 Series Jack, Sep. 2012, p. 69, published in US.

* cited by examiner

*Primary Examiner* — Monica Millner

(57) ABSTRACT

A jack for stabilizing a semi-truck trailer with improved maneuverability that can be coupled to a trailer kingpin without a need for the user to crawl or crouch under the trailer floor.

6 Claims, 4 Drawing Sheets

TRAILER STABILIZING JACK

CROSS-REFERENCES TO RELATED APPLICATIONS

This Application claims priority to provisional U.S. Application No. 61/773,862, Three-Wheeled Trailer Stabilizing Jack with a Kingpin Extension Arm by Kirk Hopkins, filed on Mar. 7, 2013.

STATEMENT REGARDING FEDERALLY SPONSORED RESEARCH OR DEVELOPMENT

Not applicable

BACKGROUND

Distribution warehouses are a common element of the flow of goods in commerce in the twenty-first century. Such warehouses are commonly used to centralize or store goods from one or multiple suppliers, and then redistribute specific goods to desired locations, often where those goods will be sold.

A typical distribution warehouse includes a number of loading docks, with each dock configured to receive a single semi-truck freight trailer. A loading dock typically includes a door from the dock to the warehouse through which goods can be moved from the trailer to the warehouse. Loading dock door opening areas are typically shaped to complement the rear end of a typical trailer, and are also typically elevated above ground level so that the loading dock door is located at a height that complements the height of the floor of the trailer. Having a loading door area with a height complementary to the floor of the trailer permits forklifts and other machines, personnel, or hardware to move easily between the warehouse and interior of the freight trailer. Although this setup is commonly seen in distribution warehouses, it is often found at other facilities and can be implemented (structural considerations permitting) anywhere that the loading and unloading of a semi trailer with a forklift or other machine is desired to be made convenient.

In a typical case, a semi trailer would be backed into the space allotted for it in a loading dock such that the rear opening of the trailer is aligned with the door of the dock and the rear of the trailer is a desired distance from the front edge of the dock door opening area. After the rear of the trailer is aligned and positioned, the trailer is often disengaged from the semi truck and the truck is relocated. It is understood in the art that trailer attaches to the semi truck by way of the trailer's pivot pin or "kingpin."

When engaged to a semi, a trailer enjoys significant support and stability, because the semi truck wheelbase serves as a support structure for the front of the trailer. When disengaged from a semi truck, trailers lose that support and stability, because they become supported and stabilized only by their own wheels. A trailer unsupported by engagement to a semi truck lacks sufficient stability to safely support shifting cargo, personnel movement, or forklifts moving within the trailer or between the trailer and the loading bay door opening area. Attempting to move cargo, personnel, or machines like forklifts within a trailer disengaged from a semi may cause the trailer to move an undesirable distance from the loading bay door opening area, or, in some cases, to tip over.

Some, but not all, trailers are equipped with front landing gear. It will be understood by one skilled in the art that a trailer's "front landing gear" comprises a jackstand permanently attached to the front portion of the trailer. Although front landing gear improve the stability of a trailer disengaged from a semi, significant risks still exist to attempting to move cargo, personnel, or machines like forklifts within the trailer without further support. If the front landing gear is insufficient to support the weight of a forklift, or if the landing gear is improperly deployed or becomes damaged, undesirable movement and tipping may occur.

It is known to the art to use an additional, independently placed jack to stabilize and support the front of a trailer unhooked from a semi, such as a trailer left for loading in a loading dock. The purpose of such stabilizing jacks is to enable the safe movement of cargo, personnel, and machines like forklifts within and around the trailer, regardless of whether a trailer is equipped with front landing gear and regardless of whether that front landing gear is in good condition or properly deployed.

Jacks known to the art suffer a number of deficiencies and drawbacks. First, jacks known to the art are heavy and difficult to maneuver. Due to the typically high center of gravity, even when a jack is equipped with one or two wheels to assist with movement, a user is required to support and carry much of the weight of the jack during movement. Jacks known to the art are equipped to be coupled with the kingpin of the trailer to optimize the stability and support provided. This, however, requires users to maneuver underneath the floor of the trailer to locate the kingpin and couple it to the jack. Maneuvering underneath a decoupled and not-yet-stabilized trailer is inherently risky. Further, the floor height of most trailers requires users to crawl or crouch when attempting to locate the kingpin and couple it to the jack. This is inconvenient and uncomfortable. Further, attempting to maneuver the heavy and unwieldy jacks known to the art while crawling or crouched is difficult and physically demanding.

There is a long-felt need for a device to support and stabilize a decoupled trailer that maintains the relative position of the freight trailer with respect to the dock and inhibits the trailer from tipping over, but that can be easily moved by a user and eliminates or minimizes the risks and difficulties associated with crawling or crouching underneath the floor of a decoupled trailer.

SUMMARY

Versions of the present invention are directed to a jack for stabilizing a semi trailer with improved maneuverability that can be coupled to a trailer kingpin without a need for the user to crawl or crouch under the trailer floor. Versions of the present invention comprise an extendable column connected to a support arm, wherein the support arm includes a coupling means near its terminal end adapted to couple to a trailer kingpin. At the end furthest from the support arm, the extendable column is connected to a base. Primary wheels are also mounted to said base. A support wheel is mounted to a support frame, and said support frame is connected said extendable column or to the base. Said support frame extends to a distance and at an angle adapted to allow the weight of the jack to rest in part on the support wheel when jack is tilted.

The present invention can, by being tilted so that its weight rests on at least one primary wheel and its support wheel, be more easily and conveniently transported and moved. The support arm of the present invention further creates an offset between the location of the trailer kingpin and the location of the base of the jack, and therefore of the user, when coupling the jack to the kingpin, enabling a user to position the jack to couple to a trailer and to couple the jack without a need to crawl or crouch under the trailer. Other versions and advantages of the invention will be apparent to those skilled in the art.

BRIEF DESCRIPTION OF THE DRAWINGS

These and other features, aspects, and advantages of the present invention will become better understood with regard to the following description and accompanying drawings, where.

DETAILED DESCRIPTION

Versions of the present invention are directed towards a stabilizing jack for semi trailers with improved maneuverability and ease of use. Versions of the present invention comprise an extendable column [1]. In a preferred embodiment of the invention, the extendable column is extended or retracted through the use of a crank [2]. The use of a cranking, ratcheting, or other similar mechanism to extend or retract an extendable column is well-known to the art, and the present invention is not limited to any particular mechanism of extension of retraction.

Figure 2:
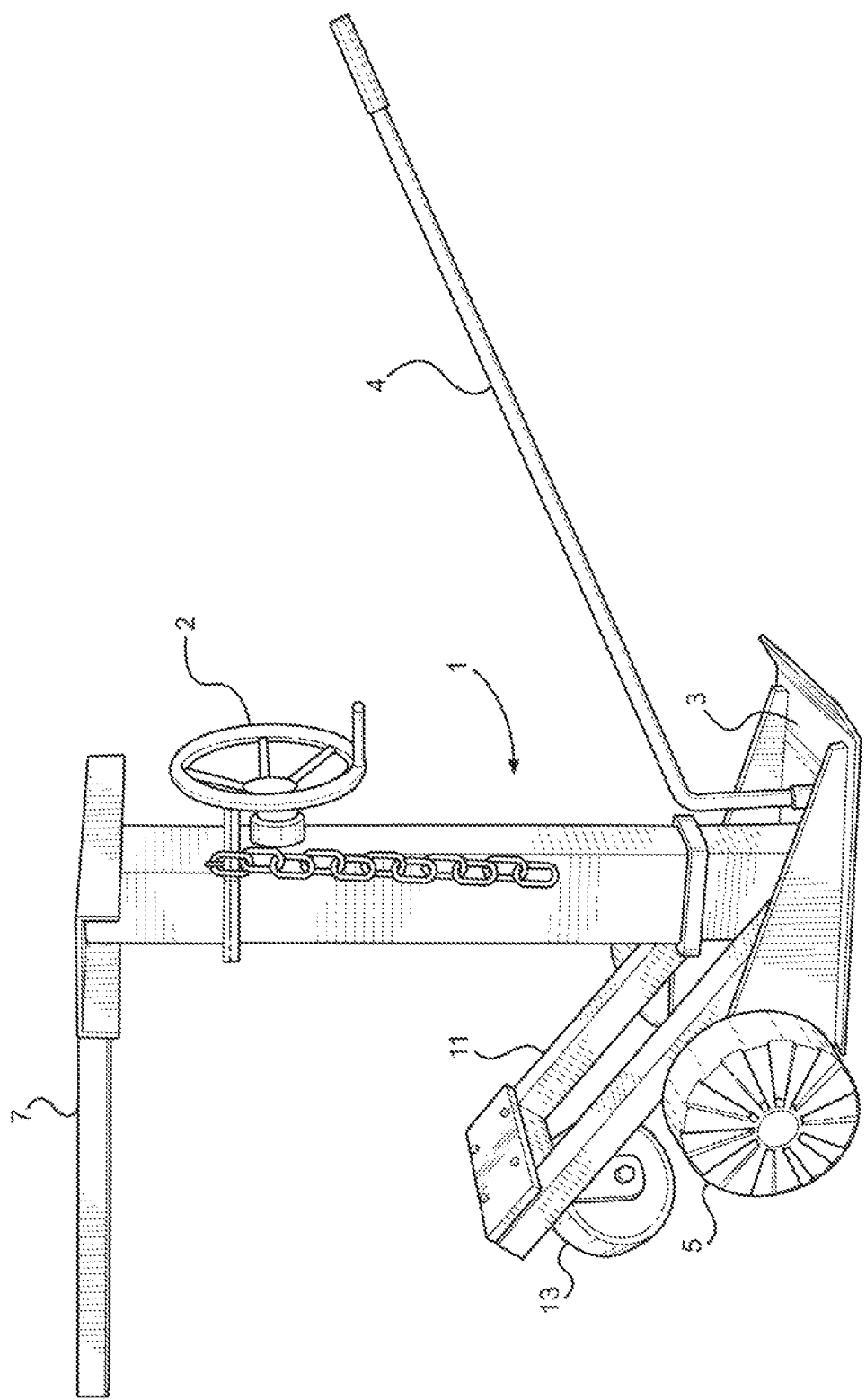
FIG. 2 shows a side view of a version of the present invention in a configuration for coupling to a trailer.
Figure 3:
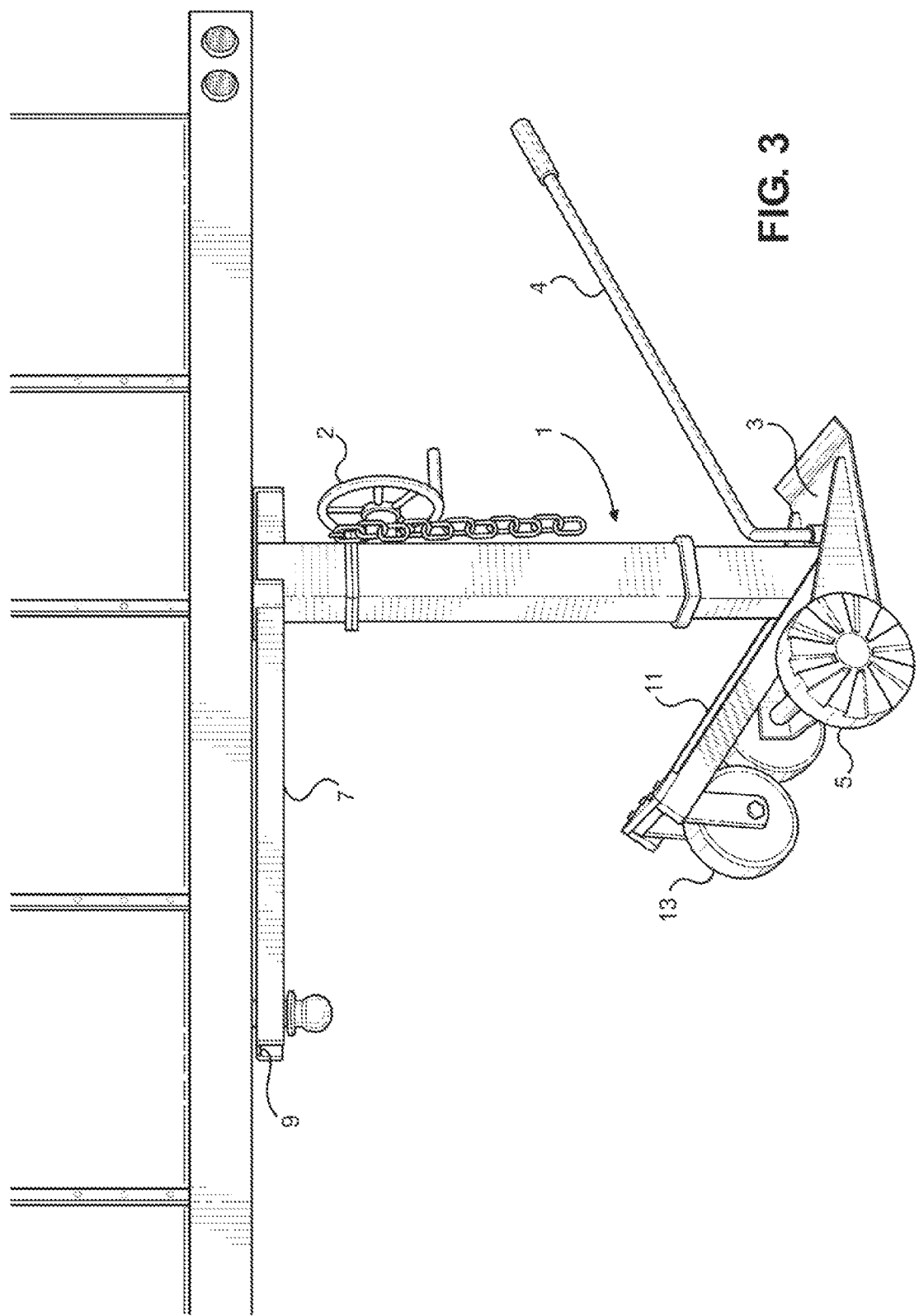
FIG. 3 shows a side view of a version of the present invention coupled to a trailer.
Figure 4:
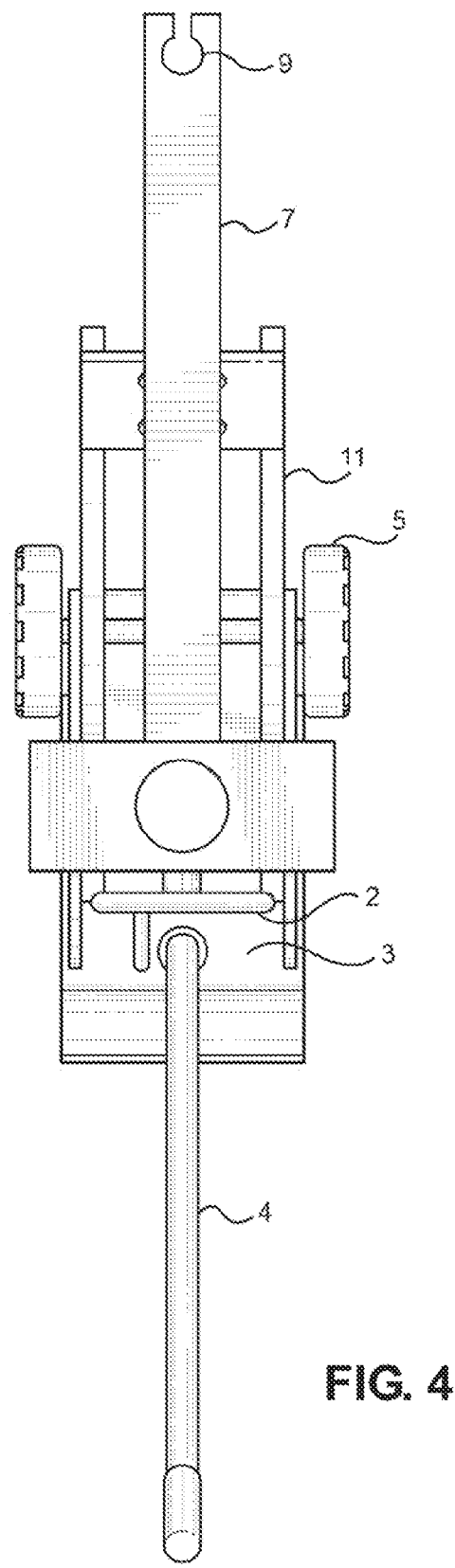
FIG. 4 shows a top view of the present invention in a configuration for coupling to a trailer.

The extendable column [1] is connected to a support arm [7]. The support arm [7] separates the connection means [9] of the jack from the main body of the extendable column [1], creating an offset between the location of the extendable column [1] and the location of the trailer kingpin. The support arm [7] further comprises a connection means [9] to a trailer kingpin. Suitable connection means [9] are those known to the an for coupling as jack to as trailer kingpin and include a hole, a tube, or a sleeve adapted to receive a trailer kingpin. In a preferred embodiment hereof, the support arm [7] extends from the extendable column in the direction of the primary wheels [5], as shown in FIG. 2, and the connection means [9] is a hole adapted to accept a trailer kingpin, as shown in FIG. 4.

The extendable column [1] is connected at its end furthest from the support arm [7] to a base [3]. The base [3] comprises a support surface adapted to stabilize the jack and prevent it from tipping or permitting excessive movement of a trailer when the jack is coupled to a trailer. When the jack is in a configuration for coupling, the base [3] rests substantially against the ground and improves the stability of the jack. In a preferred embodiment of the invention, the perimeter of the base [3] is substantially wedge-shaped, as shown in FIG. 2. A handle [4] is preferably and optionally attached to the base [3]. It will be understood to one skilled in the art that said handle could be optionally attached to the extendable column [1], support frame [11], or support arm [7].

One or more primary wheels [5] are mounted to the base. In a preferred embodiment of the present invention, two primary wheels [5] are mounted by an axle located in the thicker half of a base [3] whose perimeter is substantially wedge-shaped, such that the primary wheels [5] are mounted opposite each other with each primary wheel [5] mounted on one side of the thicker half of the base [3], as shown in FIG. 4. In this embodiment, the primary wheels [5] are mounted to the base [3] at a location offset from the body of the extendable column [1], and the support arm [7] extends from the extendable column [1] in the same direction as the direction in which the primary wheels [5] are offset. Optionally, one or more primary wheels [5] may be lockable to selectively prohibit rotation of the wheel.

Figure 1:
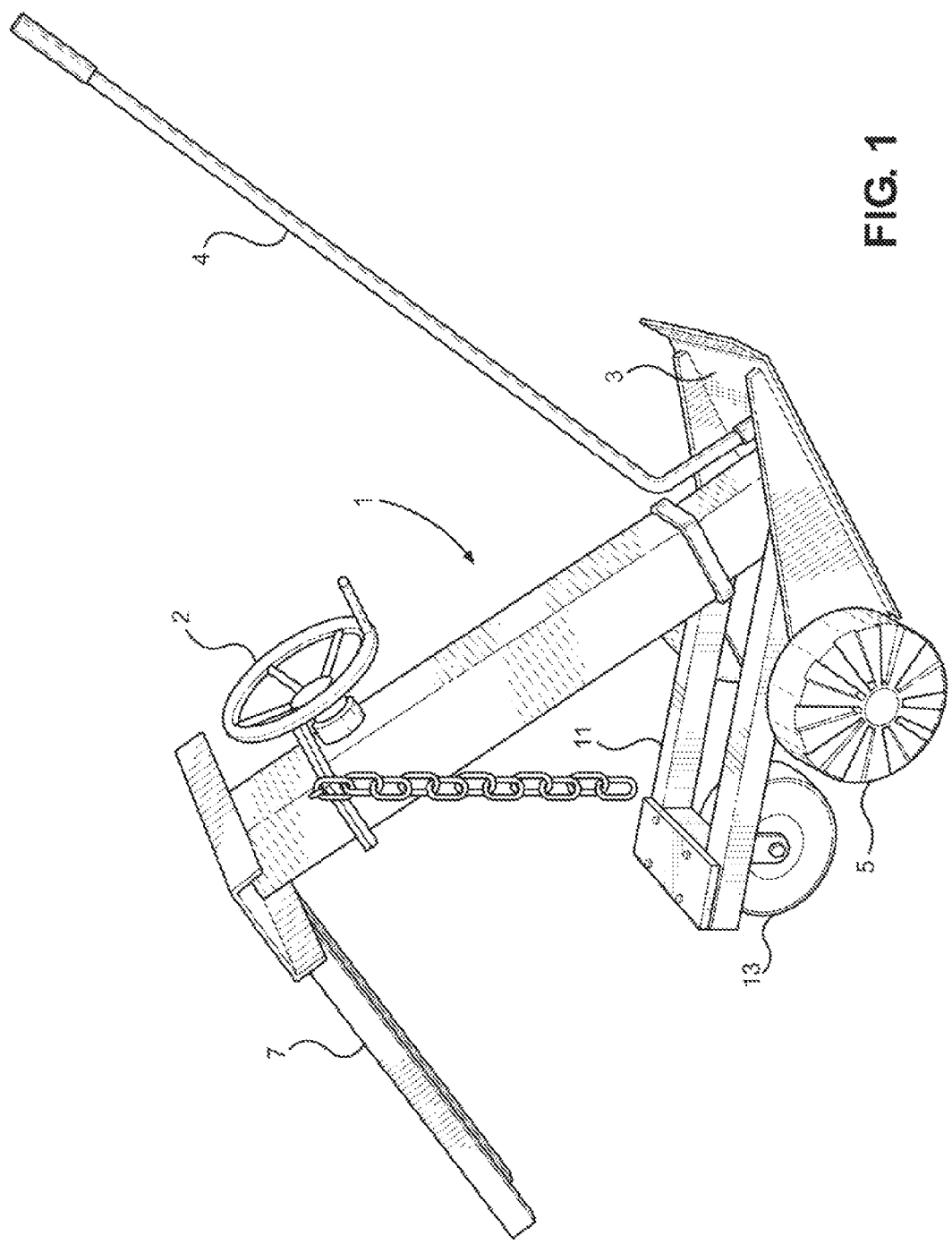
FIG. 1 shows a side view of a version of the present invention in a configuration for maneuvering.

A support frame [11] is connected to one or more of the extendable column [1] or the base [3]. A support wheel [13] is mounted to the support frame [11] opposite the end of the support frame [11] connected to the extendable column [1]. The support frame [11] extends the support wheel [13] at an angle and distance adapted to permit the jack to be tilted to rest on at least one primary wheel [5] and it support wheel [13] simultaneously without portions of the extendable column [1], base [3], support arm [7], or handle [4] contacting the ground sufficiently to interfere with movement of the jack, as shown in FIG. 1. In a preferred embodiment of the present invention, the support frame is connected at one end to the base [3] and extends in the same direction as the support arm [7], as shown in FIG. 2. In a preferred embodiment, the support frame [11] is connected to the base [3] and extends at an upward angle in the same direction as the direction of extension of the support arm [7], and the support wheel [3] is a rotatable caster-type wheel. Optionally, the support wheel [5] may be lockable.

The support arm [7] and support frame [11] are at various points herein described as having a direction of extension. This direction of extension should be understood to indicate the direction of extension of the support arm [7] or support frame [11] away from the extendable column [1] when viewing the jack from a top-down perspective. References to the direction of extension of the support arm [7] or support frame [11] do not refer to the angle formed by the connection of the support arm [7] to the extendable column [1] or formed by the connection of the support frame [11] to one or more of the base [3] or extendable column [1] when the jack is viewed from a side perspective. Preferably, the support arm [7] forms an angle of approximately 90 degrees to the extendable column [1] when the jack is viewed from a side perspective. The angle formed by the support frame [11] to one or more of the base [3] or extendable column [1] depends upon the length of the support arm [7], the length of the support frame [11], the vertical distance from the base [3] at which the support frame [11] is connected (if connected to the extendable column [1], or the amount of offset between the extendable column [1] and the point of connection of the support frame [11] (if connected to the base [3]). The support frame [11] is connected at an angle configured to cause the jack to rest on the support wheel [13] and at least one primary wheel [5] when the jack is in a configuration for maneuvering without any portions of the jack interfering with its movement. Although it will be understood that the support frame [11] will in all embodiments be angled such that the support wheel [13] is closer to the support arm [7] than the point of connection of the support frame [11] to one or more of the base [3] or extendable column [1], the present invention encompasses all angles and lengths of support frame [11] adapted to allow the jack to be placed into a configuration for maneuvering as described herein.

Versions of the present invention are placed into a configuration for maneuvering by tilting the jack until it rests on at least one primary wheel [5] and the support wheel [13] without portions of the extendable column [1], base [3], support arm [7], or support frame [11] contacting the ground so as to interfere with the movement of the jack, a version of which is shown in FIG. 1. In its configuration for maneuvering, the center of gravity of the jack rests between the primary [5] and support [13] wheels such that substantially all of the weight of the jack is supported by the wheels. The jack may in this configuration be moved with improved ease and convenience, and may be pushed or rolled under a trailer without a need for the user to crawl or crouch underneath the floor of the trailer. The use of a handle [4] provides further convenience and ease and facilitates pushing or maneuvering the jack to locations under a trailer without the user having to crouch or crawl.

Versions of the present invention are placed into a configuration for coupling to a trailer by moving a jack in a configuration for maneuvering into a desired position underneath a trailer, then tilting the extendable column [1] towards a vertical orientation until the jack rests substantially on its base [3] and the coupling means [9] is underneath and substantially aligned with the trailer kingpin. The offset distance between the extendable column [1] and the coupling means [9] created by the support arm [7] facilitates a user placing a jack in a position for coupling according to the teachings of the present invention without a need to crouch or crawl under a trailer. The use of a handle [4], optionally, further facilitates convenience of use. It is recognized that, due to user error, movement of the trailer, or other circumstances, repositioning or additional maneuvering of a jack according to the teachings of the present invention may be necessary after the device is placed in a configuration for coupling to a trailer. Such repositioning or additional maneuvering is within the scope and spirit of the invention claimed herein.

Versions of the present invention are coupled to a trailer by placing the jack into a configuration for maneuvering, maneuvering the jack to a position suitable for coupling to a trailer, placing the jack into a configuration for coupling, and extending or retracting the extendable column [1] as necessary to couple the coupling means [9] to the trailer kingpin. Optionally, the jack may further include a transverse locking pin adapted to ensure that the extendable column [1] cannot retract from the desired length of extension once coupled to a trailer.

Versions of the present invention may be decoupled from a trailer by retracting the extendable column [1] as necessary to decouple the coupling means [9] from the trailer kingpin. If an optional transverse locking pin is used, said pin must first be disengaged prior to retracting the column. The device may then be placed into a configuration for maneuvering and transported.

Accordingly, a user can maneuver to jack according to the teachings of the present invention to a trailer, place the device into a suitable position for coupling to the trailer without a need to crawl or crouch under the trailer, and couple the device to the trailer with improved ease and convenience.

Although the present invention has been described in considerable detail with reference to certain preferred versions thereof, other versions are possible. For example, materials, shapes, angles, number of wheels, means of connection, and means of extending or retracting other than those described in detail herein may be used for the versions of this invention. Therefore, the spirit and scope of the claims should not be limited to the description of the preferred versions described herein.

What is claimed is:
1. A trailer stabilizing jack comprising:
an extendable column;
a support arm comprising a first end connected to said extendable column and a second end remote from said extendable column, said second end comprising a connection means to a trailer kingpin;
a base connected to said extendable column at the end of said extendable column opposite said support arm;
at least one primary wheel mounted to said base;
a support frame comprising a third end connected to at least one of said base and said extendable column, and further comprising a cantilevered fourth end opposite said third end, wherein said fourth end extends substantially in the direction of said second end;
a support wheel mounted to said fourth end, wherein said support wheel comprises a smaller diameter than said primary wheel and is vertically offset from said primary wheel;
wherein said second end extends beyond a plane defined by the tangent of the circumference of said support wheel.

2. A trailer stabilizing jack comprising:
an extendable column;
a support arm comprising a first end connected to said extendable column and a second end remote from said extendable column, said second end comprising a connection means to a trailer kingpin;
a handle extending opposite said support arm and said support wheel, said handle extending from at least of said base and said extendable column;
a base connected to said extendable column at the end of said extendable column opposite said support arm;
at least two primary wheels mounted to said base, wherein at least a first primary wheel is mounted on a first side of said base, and at least a second primary wheel is mounted on a second side of said base opposite said first side;
a support frame comprising a third end connected to at least one of said base and said extendable column and a fourth end remote from said third end, wherein said fourth end extends at least in the general direction of said support arm and is not connected to said base or said extendable column; and
a support wheel mounted to said support frame fourth end, wherein said support wheel is vertically offset from said at least two primary wheel wheels, and wherein said second end of said support arm extends beyond said support wheel;
wherein said jack can be placed into a configuration for maneuvering by tilting said jack onto said support wheel.

3. The jack of claim 2, wherein said extendable column is extended to increase the height of the jack or retracted to decrease the height of the jack by a crank.

4. The jack of claim 2, wherein said extendable column further comprises a transverse locking pin for selectively locking the height of extension of said extendable column.

5. The jack of claim 1, wherein said extendable column is extended to increase the height of the jack or retracted to decrease the height of the jack by a crank.

6. The jack of claim 1, wherein said extendable column further comprises a transverse locking pin for selectively locking the height of extension of said extendable column.

* * * * *